United States Patent
Hakui

(10) Patent No.: US 6,951,521 B2
(45) Date of Patent: Oct. 4, 2005

(54) TRANSMISSION ACTUATOR

(75) Inventor: Takehiko Hakui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 37 days.

(21) Appl. No.: 10/678,638

(22) Filed: Oct. 6, 2003

(65) Prior Publication Data

US 2004/0116230 A1 Jun. 17, 2004

(30) Foreign Application Priority Data

Oct. 7, 2002 (JP) .................................... P.2002-294086

(51) Int. Cl.⁷ ............................................. F16H 48/30
(52) U.S. Cl. ...................... 475/150; 475/231; 192/20; 192/84.6
(58) Field of Search ............................. 192/20, 54.52, 192/84.6, 84.7; 475/150, 231

(56) References Cited

U.S. PATENT DOCUMENTS 4,976,347 A * 12/1990 Sakakibara et al. ........... 192/20
5,199,325 A * 4/1993 Reuter et al. ................ 74/335
5,462,496 A * 10/1995 Dick et al. .................. 475/204
5,911,643 A * 6/1999 Godlew et al. .............. 475/150
6,698,565 B2 * 3/2004 Cool et al. ................... 192/94

FOREIGN PATENT DOCUMENTS

JP 6-66329 * 3/1994 ................ 192/20
JP 8-19971 3/1998

* cited by examiner

Primary Examiner—Ha Ho
(74) Attorney, Agent, or Firm—Westerman, Hattori, Daniels & Adrian LLP

(57) ABSTRACT

A transmission actuator has a torque generating mechanism for generating a torque from a drive shaft, a speed reduction mechanism for multiplying a torque from the torque generating mechanism through a differential motion produced by a difference in gear ratio between a gearset of a first internally toothed gear and a first externally toothed gear and a gearset of a second internally toothed gear and a second externally toothed gear, a motion direction changing mechanism for converting the torque multiplied into a thrust and a friction engagement mechanism for transmitting power from an input shaft to an output shaft by virtue of the thrust so converted, wherein the drive shaft is made hollow so that the input shaft and the output shaft are disposed in a hollow portion of the drive shaft.

5 Claims, 7 Drawing Sheets

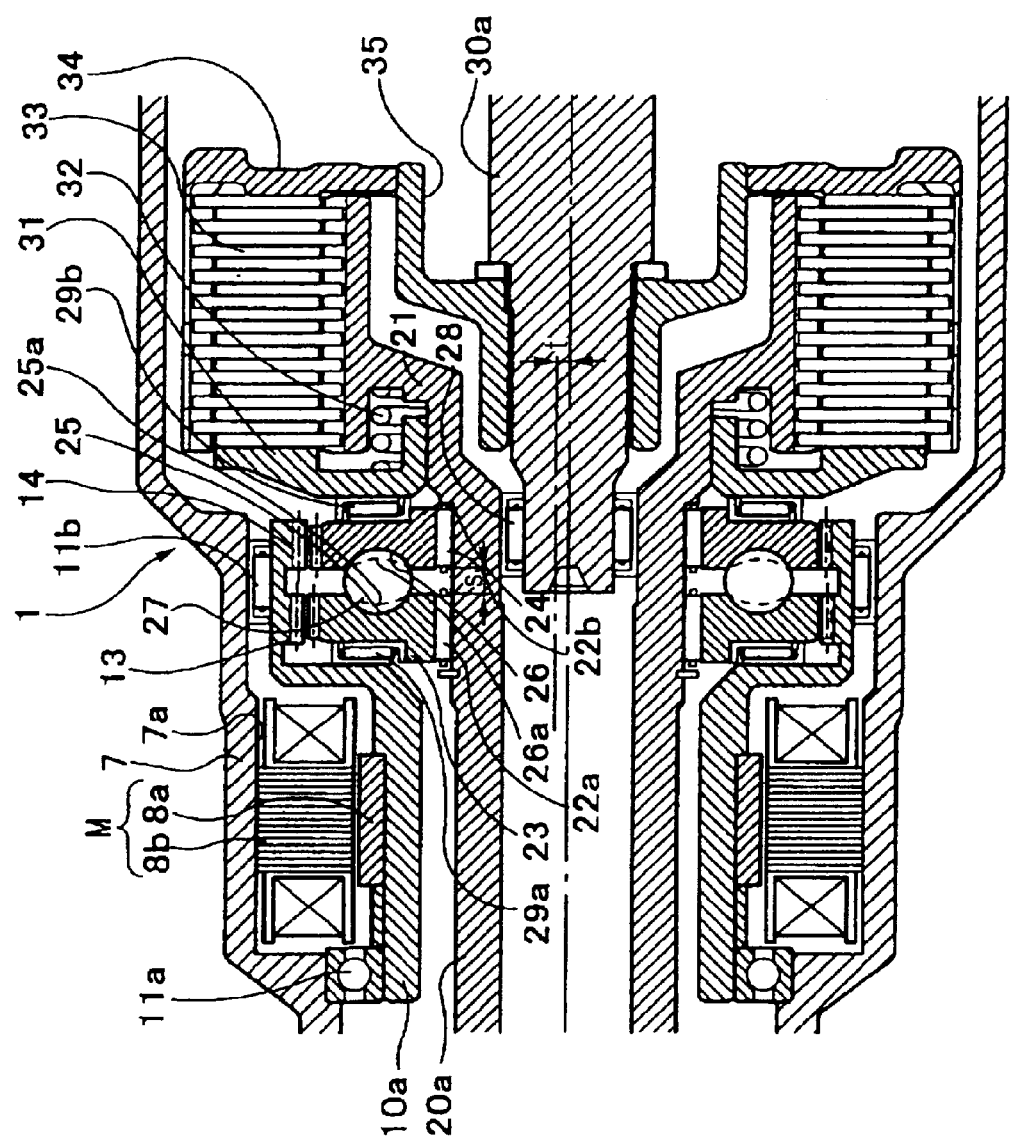
FIG. 1A
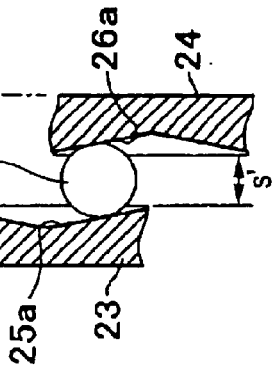
FIG. 1B
FIG. 1C

TRANSMISSION ACTUATOR

BACKGROUND OF THE INVENTION

1. Field of the Invention

The present invention relates to a transmission actuator for use in a four-wheel drive mechanism or a limited slip differential mechanism for automobiles, or in general industrial machinery.

2. Description of the Related Art

A document referred to as Patent Literature No. 1 below is known to describe as a conventional transmission actuator an electric actuator in which a motor is provided externally. An actuator for friction engagement devices described in JP-B-08-019971 will be described in detail below.

FIG. 7A is a half sectional view of an actuator 50 for friction engagement devices.

As shown in FIG. 7A, a friction multi-plate clutch 65 of the actuator 50 for friction engagement devices is provided between a clutch hub 66 connected to a front wheel side hollow shaft 62 and a clutch drum 67 connected to a rear wheel side hollow shaft 61, and the torque (rotational torque) of a motor 71, which is a torque generating mechanism, is designed to be used as a pressing force for the clutch 65. Namely, a drive gear 72 on which two kinds of gears 72a, 72b are formed is mounted on a drive shaft 71a of the motor 71, and driven gears 73, 74 are disposed so as to mesh with these two gears 72a, 72b, respectively. Hollow shafts 75, 76 having respectively cam surfaces 69, 70 provided on flange portions thereof are spline connected to the gears 73, 74 via a roller 68, and furthermore, a piston 78 is provided to connect to the shaft via a bearing 77. In addition, the rear wheel side hollow shaft 61 is supported on a transfer case 81 via a bearing 80, and a transfer drive gear 63 and a cover 82 are fixed to the clutch drum 67 with a bolt, the cover 82 being supported between the hollow shafts 75, 76 and the transfer case 81 by bearings 83, 84. Note here that a shaft on a center line is an axle 60.

Next, the operation of the actuator will be described. When the motor 71 rotates, the hollow shaft 75 and the hollow shaft 76 rotate while slightly rotating relative to each other due to a slight difference in gear ratio between the gearset of the gear 72 and the gear 74 and the gearset of the gear 72 and the gear 73. Due to this, the torque is largely increased between these two shafts, and a strong thrust is generated by a motion direction changing mechanism comprising the cam surfaces 69, 70 and the roller 68, and the thrust so generated pushes against the piston 78 via the bearing 77, whereby the friction multi-plate clutch 65 is brought into engagement. A reaction force generated then is received via the bearing 77. Thus, in order to obtain a large power transmission capability with a clutch of a limited size, it is inevitable that the thrust needs to be increased, and to make this happen, there is provided a method for increase the torque of the motor or a method for increasing the gear ratio of the speed reduction mechanism.

According to Patent Literature No. 1 above, however, since an outside diameter line of the motor protrudes from the transmission case, there is caused a problem that a limitation is imposed on the mounting position of the motor. In addition, since the motor is exposed, there is also caused a problem that the motor may be damaged. Furthermore, due to structural characteristics that the motor 71 and the drive gear 72 of the speed reduction mechanism are disposed concentrically and that the outside diameter line of the motor 71 protrudes largely outwardly of the drive shaft 71a, when the diameter of the motor is enlarged with a view to obtaining a large torque, since a center distance between a driven shaft 60a and the drive shaft 71a of the motor 71 is inevitably increased, the drive gear 72 and the driven gears 73, 74 have to be enlarged, which results in increases in mass and inertia moment, leading to a problem that the response in transmitting power is deteriorated.

On the other hand, when attempting to change gear ratios with the center distance being maintained, either the drive gear 72 or the driven gears 73, 74 should be made smaller in diameter, and since the stress the tooth face has to carry is increased while the diameter of the gear is decreased, from the viewpoint of maintaining the strength of the gear the tooth thickness needs to be increased, and, as has been described above, this triggers the problem that the mass is increased to thereby deteriorate the response.

SUMMARY OF THE INVENTION

Then, the invention was made with a view to resolving the problems, and an object thereof is to provide a small and light transmission actuator in which no portion of the outside diameter line of the motor protrudes from the transmission case so that less space can be occupied, and which is made up of gears which can provide a good response in transmitting power and a high contact ratio for good efficiency.

According to a first aspect of the invention, there is provided a transmission actuator having a torque generating mechanism having, in turn, a rotor provided on an outer circumferential surface of a drive shaft and a stator provided on a transmission case, a speed reduction mechanism disposed on either an input shaft or an output shaft for multiplying a torque from the torque generating mechanism, a motion direction changing mechanism having, in turn, two rotational elements adapted for converting a torque multiplied by a cam mechanism provided between confronting faces of a pair of externally toothed gears which constitute the speed reduction mechanism into a thrust and having provided thereon the externally toothed gears to which the torque from the speed reduction mechanism is transmitted, and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

According to the arrangement as set forth in the first aspect of the invention, since the torque generating mechanism made up of the hollow drive shaft and the motor built in the interior of the transmission case is disposed and the power transmitting input shaft and output shaft are disposed in the hollow drive shaft, the size of the outside diameter of the torque generating mechanism and the center distance between the gears of the speed reduction mechanism do not have to be considered, and therefore, there is no need to reproduce gears in association with the enlargement of the motor, and no portion of the outside diameter line of the motor protrudes from the transmission case, an actuator needing less space being thereby attained.

According to a second aspect of the invention, there is provided a transmission actuator having a torque generating mechanism having, in turn, a rotor provided on an outer circumferential surface of a drive shaft and a stator provided on an inner circumferential surface of a transmission case, a speed reduction mechanism formed integrally on the drive shaft and having a first internally toothed gear and a second internally toothed gear, and a first externally toothed gear and a second externally toothed gear which are rotatably supported on an outer circumferential surface of an input shaft or an output shaft so as to mesh with the first internally toothed gear and the second internally toothed gear, respectively, for transmission of a torque, whereby a torque from the torque generating mechanism is multiplied through a differential motion produced by a difference in gear ratio between a set of the first internally toothed gear and the first externally toothed gear and a set of the second internally toothed gear and the second externally toothed gear, a motion direction changing mechanism for converting a torque multiplied by a cam mechanism provided between confronting faces of the first and second externally toothed gears into a thrust, and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

According to the arrangement as set forth in the second aspect of the invention, since the contact ratios of the gears can be increased and hence the tooth thickness thereof can be reduced through the mesh engagement between the first and second internally toothed gears which constitute internally contacting drive gears and the first and second externally toothed gears which constitute driven gears, the gears can be made shorter in length and lighter in weight. In addition, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency.

According to a third aspect of the invention, there is provided a transmission actuator having a torque generating mechanism having, in turn, a rotor provided on an outer circumferential surface of a drive shaft and a stator provided on an inner circumferential surface of a transmission case, a speed reduction mechanism disposed on either an input shaft or an output shaft in which an internally toothed gear or an externally toothed gear provided on the drive shaft and having two gears for transmitting a torque to a first externally toothed gear to a second externally toothed gear disposed adjacent to the first externally toothed gear is provided on the first externally toothed gear and the second externally toothed gear, whereby a torque from the torque generating mechanism is multiplied through a differential motion produced by a difference in gear ratio between a set of one of the two gears and the first externally toothed gear and a set of the other gear and the second externally toothed gears, a motion direction changing mechanism for converting a torque multiplied by a cam mechanism provided between confronting faces of the first and second externally toothed gears into a thrust, and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

According to the arrangement as set forth in the third aspect of the invention, by providing the first internally toothed gear and the second internally toothed gear which contact internally and the first externally toothed gear and the second externally toothed gear which are the driven gears, since the contact ratios of the respective sets of meshing gears are increased and the tooth thickness of the gears can be reduced, the gears can be made shorter in length and lighter in weight. In addition, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency. Furthermore, since torque is designed to be transmitted from the outer circumferences of the pair of gears having the cam mechanism to the outer circumferences of the other pair of gears, the center distance of the speed reduction mechanism can be changed freely without considering the positional relationship between the torque generating mechanism and the drive shaft, and therefore, the degree of freedom in design can be increased, thereby making it possible to cover a wide range of reduction gear ratios.

According to a fourth aspect of the invention, there is provided a transmission actuator having a torque generating mechanism having, in turn, a rotor provided on an outer circumferential surface of a drive shaft and a stator provided on an inner circumferential surface of a transmission case, a speed reduction mechanism disposed on either an input shaft or an output shaft in which a carrier carrying planet gear assemblies while holding them thereon is formed integrally on the drive shaft, two planet gears for transmitting a torque from the torque generating mechanism are disposed at a plurality of locations, and two sun gears are disposed closely to each other between the planet gear assemblies and the input shaft, whereby a torque from the torque generating mechanism is multiplied through a differential motion produced by a difference in gear ratio between a set of one of the two planet gears and one of the two sun gears and a set of the other planet gear and the other sun gear, while the planet gears and the sun gears mesh with each other, a motion direction changing mechanism for converting a torque multiplied by a cam mechanism provided between confronting faces of the two sun gears into a thrust, and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

According to the arrangement as set forth in the fourth aspect of the invention, by constituting the speed reduction mechanism by the planet gearsets (planet gear assemblies), no eccentric shaft is needed, and moreover, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency.

According to a fifth aspect of the invention, there is provided a transmission actuator as set forth in the fourth aspect of the invention, wherein the speed reduction mechanism is that a carrier carrying planet gear assemblies (planet gearsets) while holding them thereon is connected to the drive shaft, that two planet gears for transmitting a torque from the torque generating mechanism are disposed at a plurality of locations, that a ring gear is formed in an inner circumferential surface of a transmission case, and that two sun gears are disposed closely to each other between the planet gear assemblies and the input shaft, so that the planet gear assemblies and the sun gears are brought into mesh engagement with each other, allowing the planet gear assemblies not only to rotate on their own axes but also to rotate around the sun gears, whereby a torque from the torque generating mechanism is multiplied through a differential motion produced by a difference in gear ratio between a set of one of the two planet gears and one of the two sun gears and a set of the other planet gear and the other sun gear, while the planet gears and the sun gears mesh with each other.

According to the arrangement as set forth in the fifth aspect of the invention, speed reductions through a number of combinations of reduction gear ratios can be made possible by providing the ring gear on the inner circumferential surface of the transmission case. In addition, no eccentric shaft is needed by incorporating the planet gear assemblies in the speed reduction mechanism, and moreover, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency.

BRIEF DESCRIPTION OF THE DRAWINGS

FIGS. 1A to 1C are Drawings showing a first embodiment of the invention, in which FIG. 1A is a sectional view of a transmission actuator, FIG. 1B is a partial sectional view showing the configuration of a cam mechanism and illustrating the condition of a cut-off position, and FIG. 1C is a partial sectional view illustrating the condition of a connecting position of the cam mechanism;

FIG. 6 is a sectional view of a transmission actuator according to a sixth embodiment of the invention; and, FIGS. 7A and 7B are drawings illustrating a related art, in which

DETAILED DESCRIPTION OF THE PREFERRED EMBODIMENTS

Figure 2:
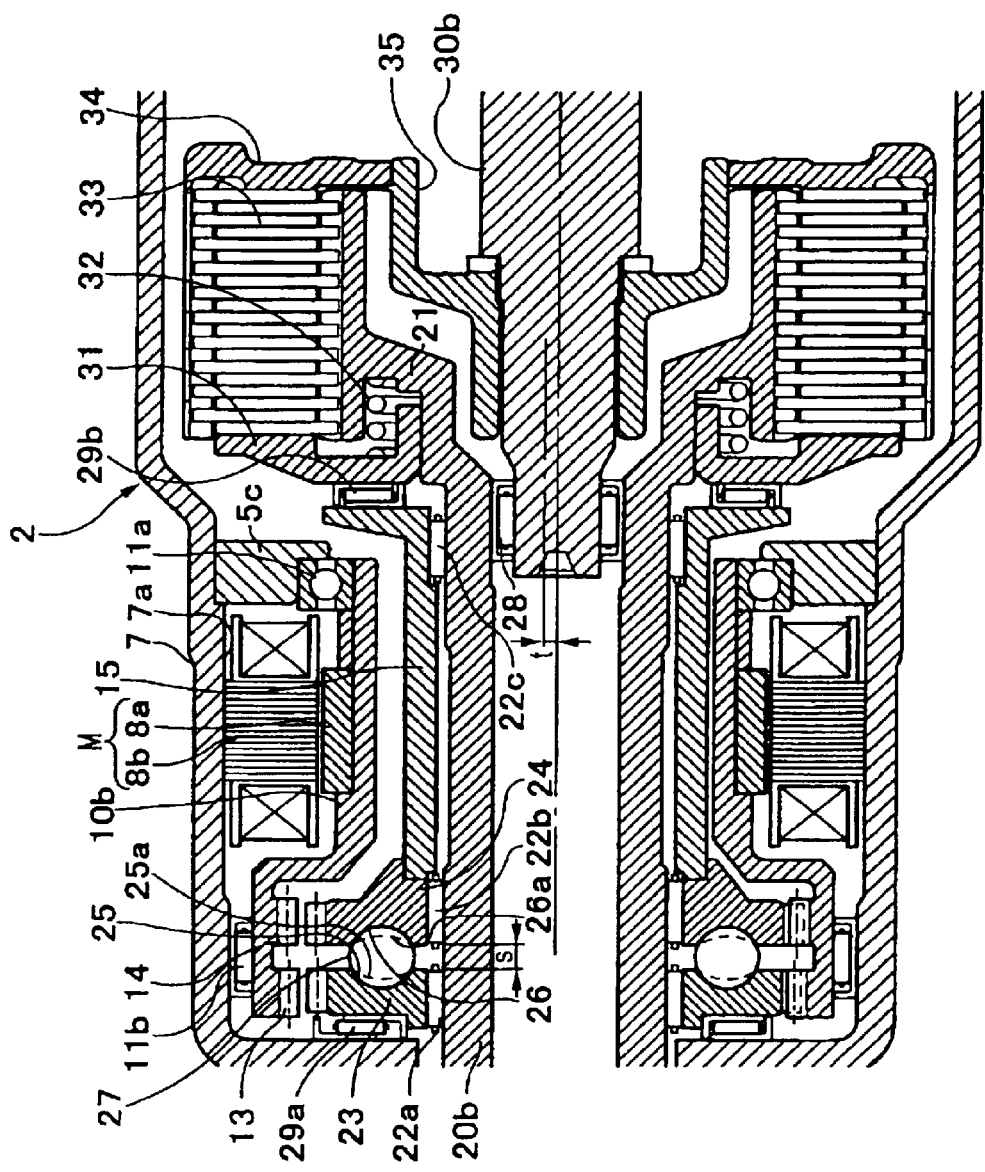
FIG. 2 is a sectional view of a transmission actuator according to a second embodiment of the invention.

Referring to the accompanying drawings, six embodiments of transmission actuators according to the invention will sequentially be described in detail below.

Note that first to sixth embodiments correspond to the first aspect, the first and second embodiments to the second aspect, the third and fourth embodiments to the third aspect, the fifth embodiment to the fourth aspect, and the sixth embodiment to the fifth aspect of the invention.

<First Embodiment>

FIGS. 1A to 1C show drawings illustrating a first embodiment of the invention, in which FIG. 1A is a sectional view showing a transmission actuator according to the first embodiment, FIG. 1B is a partial sectional view showing the configuration of a cam mechanism and the condition of a cut-off position, and FIG. 1C is a partial sectional view similarly showing the condition of a connecting position in the cam mechanism.

As shown in FIG. 1A, a transmission actuator 1 includes a torque generating mechanism, a speed reduction gear, a motion direction changing mechanism and a friction engagement mechanism.

The torque generating mechanism includes a drive shaft and a built-in motor (hereinafter, referred to as a motor M) built in a case and comprises a rotor $8a$ fixedly fitted on an outer circumferential surface of a left end of the hollow drive shaft $10a$ and a stator $8b$ fixedly fitted in an inner circumferential surface $7a$ of the case 7. Bearings $11a$, $11b$ are fitted between the left end of the hollow drive shaft $10a$ and an outer circumference of a right end of the hollow drive shaft $10a$ which is expanded in a diametrical direction and the case 7, respectively, so that the hollow drive shaft 10 is allowed to rotate relative to the case 7.

Note that an electric motor such as a pulse motor and a stepping motor or an ultrasonic motor may be used for the motor M.

The speed reduction mechanism is a mechanism for multiplying a torque generated by the torque generating mechanism by generating a differential motion by a difference in gear ratio between two sets of gears to implement a reduction in speed by the differential motion so generated. The right end of the drive shaft $10a$ which is diametrically expanded is rotatably supported by the bearing $11b$, and two gears which constitute a first internally toothed gear 13 and a second internally toothed gear 14 are formed in an inner circumferential surface of the right end of the drive shaft $10a$ with a slight amount of eccentricity "t" being provided relative to an input shaft $20a$ and an output shaft $30a$. In addition, the two gears or the first internally toothed gear 13 and the second internally toothed gear 14 are formed integrally. The input shaft $20a$ is caused to pass through the hollow drive shaft $10a$, and a first externally toothed gear 23 and a second externally toothed gear 24 which are rotatably supported on an outer circumferential surface of the input shaft $20a$ by bearings $22a$, $22b$, respectively, mesh with the first internally toothed gear 13 and the second internally toothed gear 14, respectively, not only to transmit torque but also to implement a speed reduction through a difference in gear ratio between the two sets of the internally and externally toothed gears, that is, a set of the first internally toothed gear 13 and the first externally toothed gear 23 and a set of the second internally toothed gear 14 and the second externally toothed gear 24.

Assuming, for example, that the number of teeth of the first externally toothed gear 23 is 70, the number of teeth of the second externally toothed gear 24 is 78, the number of teeth of the first internally toothed gear 13 is 73 and the number of teeth of the second internally toothed gear 14 is 81, the first externally toothed gear 23 rotates relative to the drive shaft $10a$ with a gear ratio of 1.0429, and the second externally toothed gear 24 rotates relative to the drive shaft $10a$ with a gear ratio of 1.0385. In this case, a differential motion (a difference in phase in a rotational direction) is generated between the first externally toothed gear 23 and the second externally toothed gear 24 by a difference of 0.0044 in gear ration between the first externally toothed gear 23 and the second externally toothed gear 24 which results when the drive shaft 10a completes one revolution, whereby the rotation of the motor M is largely slowed down. The total gear ratio in this case, however, is 227.5.

The motion direction changing mechanism has a cam mechanism that is formed between confronting faces of the first externally toothed gear 23 and the second externally toothed gear 24. In this cam mechanism, a plurality of balls 27, 27... are disposed in cam grooves 25, 26. As shown in FIGS. 1B, 1C, the ball 27 rides on inclined surfaces formed on the cam grooves 25, 26 by virtue of a differential motion between the first externally toothed gear 23 and the second externally toothed gear 24, and a width wise dimension s between the first externally toothed gear 23 and the second externally toothed gear 24 is increased to a dimension s'. Thus, a torque (a rotational force) multiplied by the reduction in speed is converted into a thrust (an axial force).

In addition, a thrust bearing 29a is disposed between a left side face of the first externally toothed gear 23 and a right end face of the drive shaft 10a, and a bearing 29b is similarly disposed between a right side face portion of the second externally toothed gear 24 and a piston 31, so that a thrust is supported.

The friction engagement mechanism is a friction multi-plate clutch 33, and an inner circumferential surface of the friction multi-plate clutch 33 is held to a clutch hub 21 formed integrally with the input shaft 20a at a rear end thereof, the piston 31 is held between a left end face of the friction multi-plate clutch 33 and the bearing 29b in a state in which the piston 31 is pushed back by virtue of a biasing force of a spring 32, and a right end face of the friction multi-plate clutch 33 is covered with a clutch drum 34, which is then connected to a beam 35 for spline connection to the output shaft 30a. Furthermore, a left end portion of the output shaft 30a is rotatably supported on an inner circumferential portion of the input shaft 20a via a bearing 28.

As a result, the rotational force (torque) of the input shaft 20a is converted into a thrust (a pushing force) by the motion direction changing mechanism, and the thrust so generated then pushes the friction multi-plate clutch 33 via the bearing 29b and the piston 31, whereby the multiple plates are connected together by virtue of a friction, thus the torque being transmitted to the output shaft 30a. On the contrary, in order to cut off the torque, when removing the thrust from the motion direction changing mechanism, the piston 31 is pushed back to disengage the friction multi-plate clutch 33 by virtue of the biasing force of the spring 32 disposed between the piston 31 and the clutch hub 21, whereby the transmission of torque to the output shaft 30a is cut off.

Note that the piston 31 is not rotatable (not shown) but is axially movable relative to the input shaft 20a.

Next, the operation of the transmission actuator will be described.

As shown in FIG. 1A, since the reduction gear is inoperative due to the torque generating mechanism normally being made inoperative, the motion direction changing mechanism is maintained at an initial position, and hence, the friction multi-plate clutch 33 of the friction engagement mechanism is maintained in an opened state by virtue of the biasing force of the spring 32, whereby the transmission of rotational force (torque) of the input shaft 20a to the output shaft 30a is cut off by the friction multi-plate clutch 33.

Once an activation signal is inputted into the motor M of the torque generating mechanism, the stator 8b of the motor M is excited, whereby the rotor 8a fitted on the drive shaft 10a is rotated, and hence the drive shaft 10a which is made so integral with the rotor 8a is also rotated. Then, the two gears, that is, the first internally toothed gear 13 and the second internally toothed gear 14 which are provided in the inner circumferential surface of the diametrically expanded right end of the drive shaft 10a rotate with the slight amount of eccentricity "t". The input shaft 20a is caused to pass through the interior of the hollow drive shaft 10a to be disposed in place therein, and the first externally toothed gear 23 and the second externally toothed gear 24 which are rotatably supported on the outer circumferential surface of the input shaft 20a are brought into mesh engagement with the first internally toothed gear 13 and the second internally toothed gear 14, respectively, to thereby generate a torque. As a result, a differential motion is generated in rotation due to the gear ratios of the set of the first internally toothed and externally toothed gears and the set of the second internally toothed and externally toothed gears being different from each other, whereby a reduction in speed is implemented and the torque is multiplied.

On the other hand, as shown in FIGS. 1B, 1C, the ball 27 rides on the inclined surfaces 25a, 26a formed on the cam grooves 25, 26 of the cam mechanism due to a rolling motion of the ball 27 in the cam grooves 25, 26 and a differential motion between the ball 27 and the cam grooves 25, 26 to thereby press expand the dimension s between the first externally toothed gear 23 and the second externally toothed gear 24, whereby the piston 31 overcomes the biasing force of the spring 32 to push the friction multi-plate clutch 33 so as to bring the friction multi-plate clutch 33 into engagement for transmission of the torque to the output shaft 30a.

In addition, when bringing the friction multi-plate clutch 33 out of such an engagement, the rotation effected by the motor M is reversed so that the dimension press expanded as shown in FIG. 1C is restored to its initial state as shown in FIG. 1B, whereby the connection is cut off.

<Second Embodiment>

What is different from the first embodiment is that the positions of a motor and internally toothed gears formed by diametrically expanding a drive shaft are longitudinally reversed.

FIG. 2 is a sectional view illustrating a transmission actuator according to a second embodiment of the invention.

Note that in a transmission actuator 2 shown in FIG. 2, like reference numerals are imparted to like components to those illustrated in FIG. 1A, and a detailed description thereof will be omitted.

As shown in FIG. 2, the transmission actuator 2 includes a torque generating mechanism, a speed reduction gear, a motion direction changing mechanism and a friction engagement mechanism.

The torque generating mechanism is a built-in motor M and comprises a rotor 8a fixedly fitted on an outer circumferential surface of a right end of a hollow drive shaft 10b and a stator 8b fixed fitted in an inner circumferential surface 7a of a case 7. The right end of the hollow drive shaft 10b is rotatably supported by a bearing 11a on the case 7 via a retainer 5c, a left end of the hollow shaft 10b which is diametrically expanded is rotatably supported by a bearing 11b disposed between an outer circumferential surface of the diametrically expanded left end of the hollow drive shaft 10b and the case 7, whereby the hollow drive shaft 10b is allowed to freely rotate.

The speed reduction mechanism generates a differential motion by making use of a difference in gear ratio between two sets of gears to implement a reduction in speed by the differential motion so generated and multiplies a torque generated by the torque generating mechanism by the reduction in speed so implemented. The diametrically expanded left end of the drive shaft 10b is rotatably supported by the bearing 11b, and two gears which constitute a first internally toothed gear 13 and a second internally toothed gear 14 for transmitting a torque from the torque generating mechanism are formed in an inner circumferential surface of the diametrically expanded left end of the drive shaft 10b with a slight amount of eccentricity "t" relative to an input shaft 20b and an output shaft 30b. In addition, the two gears or the first internally toothed gear 13 and the second internally toothed gear 14 are formed integrally while having the numbers of teeth which are slightly different. The input shaft 20b is caused to pass through the interior of the hollow drive shaft 10b, and a first externally toothed gear 23 and a second externally toothed gear 24 which are rotatably supported on an outer circumferential surface of the input shaft 20b are brought into mesh engagement with the first internally toothed gear 13 and the second internally toothed gear 14, respectively, not only for transmission of torque but also for implementation of a reduction in speed through a difference in gear ratio between the set of the first internally toothed gear 13 and the first externally toothed gear 23 and the set of the second internally toothed gear 14 and the second externally toothed gear 24.

The motion direction changing mechanism includes cam grooves 25, 26 of a cam mechanism which are formed in confronting surfaces of the first externally toothed gear 23 and the second externally toothed gear 24 so that a ball 27 can roll therein, and a plurality of balls 27, 27 . . . are disposed in the cam grooves 25, 26 so formed. As shown in FIGS. 1B, 1C, the ball 27 rides on inclined surfaces 25a, 26a formed on the cam grooves 25, 26 by a differential motion generated between the first externally toothed gear 23 and the second externally toothed gear 24, and a dimension s between the first externally toothed gear 23 and the second externally toothed gear 24 is press expanded to a dimension s', whereby the dimension is eventually increased. Thus, the torque multiplied by the reduction in speed is then converted into a thrust.

A thrust bearing 29a is disposed between a left side face of the first externally toothed gear 23 and a right end face of the case 7, and a pressure guide 15 is connected to a right side face of the second externally toothed gear 24. A flange-like collar is formed at a right end portion of the pressure guide 15, and a bearing 22c is rotatably supported between an inner circumferential surface of the right end portion and an outer circumferential surface of the input shaft 20b. In addition, a thrust bearing 29b is disposed between a right end face of the pressure guide 15 and a piston 31. Thus, the pressure guide 15 is supported in such a manner as to freely rotate.

The friction engagement mechanism is a friction multi-plate clutch 33, and an inner circumferential surface of the friction multi-plate clutch 33 is held by a clutch hub 21 formed integrally with a rear end of the hollow input shaft 20b, the piston 31 is held between a left end face of the friction multi-plate clutch 33 and the bearing 29b in a state in which the piston 31 is pushed back by virtue of a biasing force of a spring 32, and a right end face of the friction multi-plate clutch 33 is covered with a clutch drum 34, which is then connected to a beam 35 for spline connection to the output shaft 30b. As a result, a thrust generated by the motion direction changing mechanism pushes the friction multi-plate clutch 33 via the piston 31, whereby the multiple plates are connected together by virtue of a friction, thus the torque being transmitted to the output shaft 30b. On the contrary, in order to cut off the torque, when removing the thrust from the motion direction changing mechanism, the piston 31 is pushed back to disengage the friction multi-plate clutch 33 by virtue of the biasing force of the spring 32 disposed between the piston 31 and the clutch hub 21, whereby the transmission of torque to the output shaft 30b is cut off. Note that the second externally toothed gear 24 and the thrust bearing 29b are allowed to slide in axial directions.

Next, the operation of the transmission actuator 2 will be described.

The operation of the transmission actuator 2 is substantially similar to that of the transmission actuator 1 that has been described previously. As shown in FIG. 2, when an activation signal enters the motor M of the torque generating mechanism, the motor M rotates the rotor 8a fixedly fitted on the hollow drive shaft 10b and also rotates the drive shaft 10b which is integral with the rotor 8a. Then, the two gears or the first internally toothed gear 13 and the second internally toothed gear 14 which are provided in the internal circumferential surface of the diametrically expanded right end of the hollow drive shaft 10b rotate with the slight amount of eccentricity "t". The input shaft 20b is caused to pass through the interior of the hollow drive shaft 10b to be disposed in place therein, and the first externally toothed gear 23 and the second externally toothed gear 24 which are rotatably supported on the outer circumferential surface of the input shaft 20b are brought into mesh engagement with the first internally toothed gear 13 and the second internally toothed gear 14, respectively, to thereby transmit the torque. As a result, a differential motion is generated in rotation due to the gear ratios of the set of the first internally toothed and externally toothed gears and the set of the second internally toothed and externally toothed gears being different from each other, whereby a reduction in speed is implemented and the torque is multiplied.

On the other hand, as shown in FIGS. 1B, 1C, the ball 27 rides on the inclined surfaces 25a, 26a formed on the cam grooves 25, 26 of the cam mechanism due to a rolling motion of the ball 27 in the cam grooves 25, 26 and a differential motion between the ball 27 and the cam grooves 25, 26 to thereby press expand a gap between the first externally toothed gear 23 and the second externally toothed gear 24, whereby the piston 31 overcomes the biasing force of the spring 32 to push the friction multi-plate clutch 33 so as to bring the friction multi-plate clutch 33 into engagement for transmission of the torque to the output shaft 30a.

In addition, when bringing the friction multi-plate clutch 33 out of such an engagement, the rotation effected by the motor M is reversed so that the gap press expanded is restored to its initial state.

The descriptions of the first and second embodiments will be summarized. In FIGS. 1, 2, the transmission actuator 1, 2 comprises the torque generating mechanism having, in turn, the rotor 8a provided on the outer circumferential surface of the one end of the drive shaft 10a, 10b and the stator 8b provided on the inner circumferential surface of the transmission case, the speed reduction mechanism formed integrally on the other end of the drive shaft for multiplying a torque from the torque generating mechanism and having the first internally toothed gear 13 and the second internally toothed gear 14, and the first externally toothed gear 23 and the second externally toothed gear 24 which are rotatably supported on the outer circumferential surface of the input shaft 20a, 20b which is caused to pass through the interior of the drive shaft so as to mesh with the first internally toothed gear 13 and the second internally toothed gear 14, respectively, for transmission of a torque, whereby a torque from the torque generating mechanism is multiplied through a differential motion produced by a difference in gear ratio between the set of the first internally toothed gear 13 and the first externally toothed gear 23 and the set of the second internally toothed gear 14 and the second externally toothed gear 24, the motion direction changing mechanism in which the cam grooves 25, 26 of the cam mechanism are formed in the confronting surfaces of the first externally toothed gear 23 and the second externally toothed gear 24 so that the ball 27 can roll therein, the plurality of balls 27, 27 . . . are disposed in the cam grooves 25, 26, and the ball 27 rides on the inclined surfaces 25a, 26a formed on the cam grooves 25, 26 to thereby convert the multiplied torque into the thrust, and the friction engagement mechanism held to the clutch hub 21 integrally formed on the one end of the input shaft 20a, 20b and adapted to be pushed via the piston 31 by the thrust generated by the motion direction changing mechanism so as to transmit the power from the input shaft 20a, 20b to the output shaft 30a, 30b, wherein the drive shaft 10a, 10b is made hollow so that the input shaft 20a, 20b and the output shaft 30a, 30b are disposed in a through hole in the hollow portion of the drive shaft 10a, 10b.

<Third Embodiment>

Figure 3:
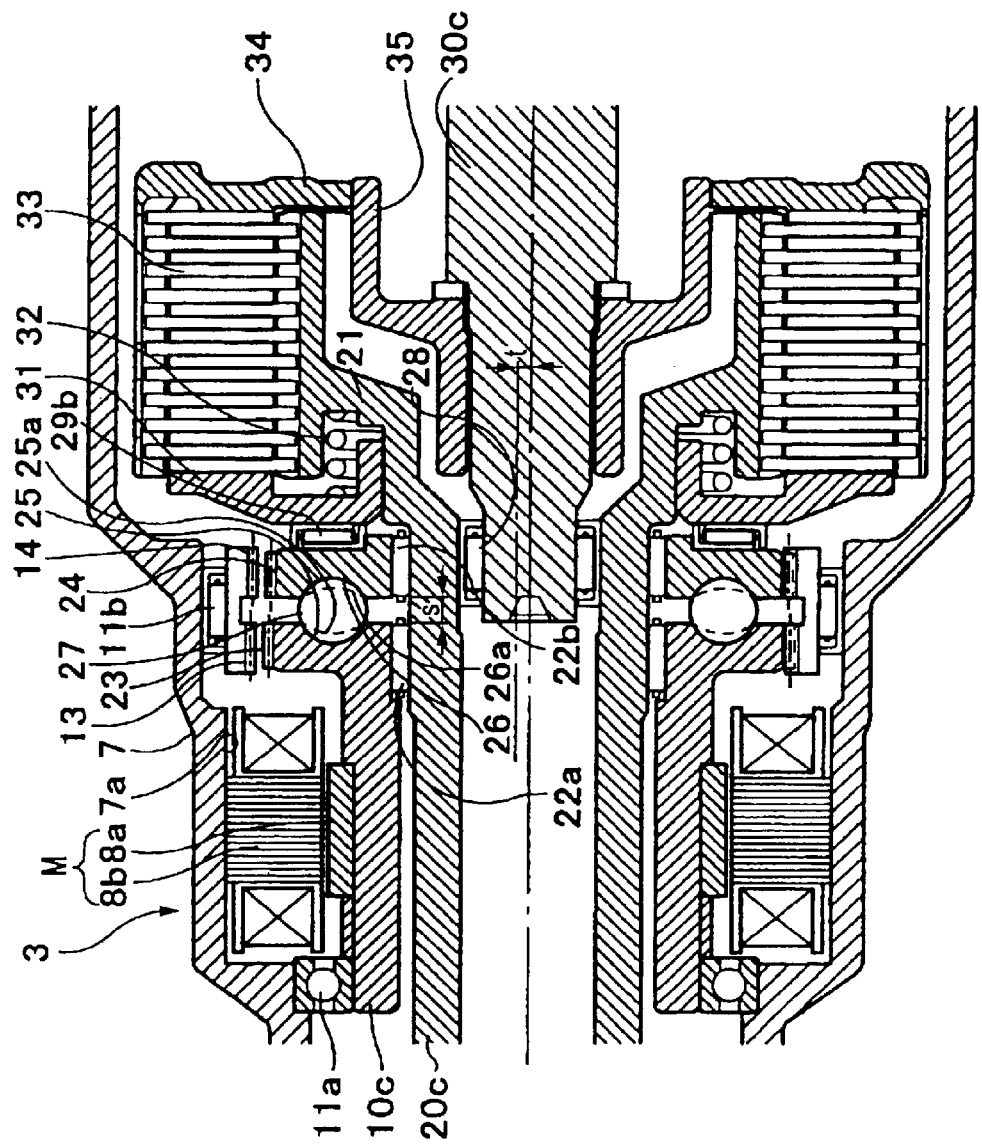
FIG. 3 is a sectional view of a transmission actuator according to a third embodiment of the invention.

What is different from the first and second embodiments is that a first externally toothed gear is provided integrally on a drive shaft, a second externally toothed gear is provided closely to the first externally toothed gear, and a first internally toothed gear and a second internally toothed gear are rotatably supported on an inner circumferential surface of a case in such a manner as to mesh with the first externally toothed gear and the second externally toothed gear, respectively, to thereby implement a reduction in speed. FIG. 3 is a sectional view showing a third embodiment of a transmission actuator.

As shown in FIG. 3, a transmission actuator 3 includes a torque generating mechanism, a speed reduction gear, a motion direction changing mechanism and a friction engagement mechanism.

The torque generating mechanism is a motor M and includes a rotor 8a fixedly fitted on an outer circumferential surface of a left end portion of a hollow drive shaft 10c and a stator 8b fixedly fitted in an inner circumferential surface 7a of a case 7. A bearing 11a is disposed between an outer circumferential surface of a left end of the hollow drive shaft 10c and the inner circumferential surface of the case 7 so as to rotatably support the left end of the drive shaft 10c on the case 7, whereas a right end of the drive shaft 10c is formed into a flange-like configuration, and a bearing 22a is disposed between an inner circumferential surface of the flange-like formed right end of the drive shaft 10c and an outer circumferential surface of an input shaft 20c so as to rotatably support the right end of the drive shaft 10c on the input shaft 20c.

In the speed reduction mechanism, the right end of the drive shaft 10c is formed into the flange-like configuration, and a first externally toothed gear 23 is formed on an outer circumferential surface of the flange-like formed right end of the drive shaft 10c. A second externally toothed gear 24 providing a different gear ratio is rotatably supported, in a similar fashion, on the outer circumferential surface of the input shaft 20c by a bearing 22b at a position close to the first externally toothed gear 23. Then, a first internally toothed gear 13 and a second internally toothed gear 14 are formed on outer circumferential surfaces of the first externally toothed gear 23 and the second externally toothed gear 24 with a slight amount of eccentricity "t" relative to the drive shaft 10d, the input shaft 20d and an output shaft 30d. In addition, the first internally toothed gear 13 and the second internally toothed gear 14 are formed integrally, and outer circumferential surfaces of the first and second externally toothed gears are rotatably supported on the inner circumferential surface of the case 7, whereby the first externally toothed gear 23 and the second externally toothed gear 24 mesh with the first internally toothed gear 13 and the second internally toothed gear 14, respectively, not only to transmit the torque but also to multiply the torque by a differential motion produced by a slight difference in gear ratio between the set of the first externally toothed gear and the first internally toothed gear and the set of the second externally toothed gear and the second internally toothed gear.

As has been described in the first and second embodiments, in the motion direction changing mechanism, a dimension s between the first externally toothed gear 23 and the second externally toothed gear 24 is press expanded to a dimension s' by the cam mechanism, whereby a gap between the two gears is increased.

The friction engagement mechanism is a friction multi-plate clutch 33, and a thrust generated by the motion direction changing mechanism pushes the friction multi-plate clutch 33 via a piston 31, whereby the friction multi-plate clutch 33 is engaged and the torque is transmitted to the output shaft 30c. On the contrary, in order to cut off the transmission of the torque, when the thrust is removed from the motion direction changing mechanism, the piston 31 is pushed back and the friction multi-plate clutch 33 is disengaged by virtue of the biasing force of a spring 32 disposed between the piston 31 and a clutch hub 21, and the transmission of torque to the output shaft 30c is cut off.

Next, the operation of the transmission actuator 3 will be described.

As shown in FIG. 3, when an activating signal enters the motor M of the torque generating mechanism, the motor M rotates the rotor 8a fixedly fitted on the hollow drive shaft 10c, as well as the drive shaft 10 which is made integral with the rotor 8a. Then, the first externally toothed gear 23 formed on the outer circumference of the flange-like formed right end of the drive shaft 10c is rotated concentrically relative to the input shaft 20c. When the drive shaft 10c is rotated, the first externally toothed gear 23 is rotated, and then, the first internally toothed gear 13 is rotated. Since the first and second internally toothed gears 13, 14 are formed integrally, the second internally toothed gear 14 is also rotated together, whereby the rotational force (torque) is given to the second externally toothed gear 24. As a result, since the numbers of teeth of the first externally gear 23 and the second externally toothed gear 24 are slightly different, the numbers of teeth of the first and second internally toothed gears 13, 14 are also slightly different and the gear ratios of the set of the first internally and externally toothed gears 13, 23 and the set of the second internally and externally toothed gears 14, 24 are slightly different, a differential motion is generated, and a reduction in speed is implemented to thereby multiply the torque.

On the other hand, when the differential motion is so generated, as shown in FIGS. 1B, 1C, the ball 27 rides on the inclined surfaces 25a, 26a formed on the cam grooves 25, 26 of the cam mechanism which are formed in the confronting surfaces of the first externally toothed gear 23 and the second externally toothed gear 24 so that the ball 27 can roll therein, and a gap between the first externally toothed gear 23 and the second externally toothed gear 24 is press expanded, whereby the piston 31 overcomes the biasing force of the spring 32 and pushes against the friction multi-plate clutch 33 to bring it into engagement, the torque being thereby transmitted to the output shaft 30c.

<Fourth Embodiment>

What is different from the third embodiment is that pinion gears which are externally toothed gears having a small diameter are provided instead of the internally toothed gears. FIG. 3 is the sectional view showing the transmission actuator according to the third embodiment.

Note that like reference numerals are imparted to like components to those illustrated in FIG. 1A, and a detailed description thereof will be omitted.

Figure 4:
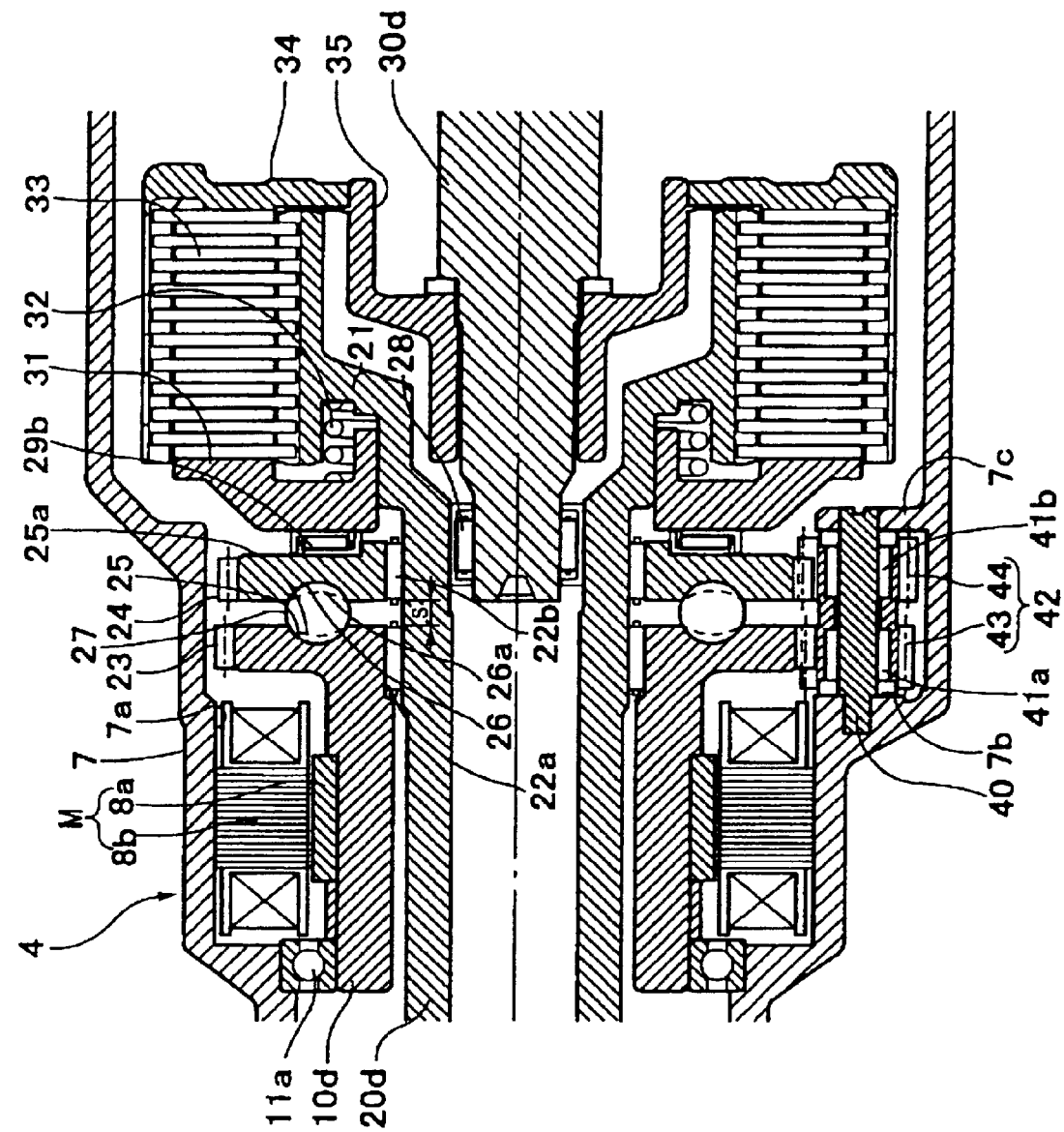
FIG. 4 is a sectional view of a transmission actuator according to a fourth embodiment of the invention.

As shown in FIG. 4, a transmission actuator 4 includes a torque generating mechanism, a speed reduction gear, a motion direction changing mechanism and a friction engagement mechanism. The torque generating mechanism is a motor M and includes a rotor 8a fixedly fitted on an outer circumferential surface of a left end portion of a hollow drive shaft 10d and a stator 8b fixedly fitted in an inner circumferential surface 7a of a case 7. A bearing 11a is disposed between an outer circumferential surface of a left end of the hollow drive shaft 10d and the inner circumferential surface of the case 7 so as to rotatably support the left end of the drive shaft 10d on the case 7, whereas a right end of the drive shaft 10d is formed into a flange-like configuration, and a bearing 22a is disposed between an inner circumferential surface of the flange-like formed right end of the drive shaft 10d and an outer circumferential surface of an input shaft 20d so as to rotatably support the right end of the drive shaft 10c on the input shaft 20d.

In the speed reduction mechanism, the right end of the drive shaft 10d is formed into the flange-like configuration, and a bearing 11a is disposed between an inner circumferential surface of the right end of the drive shaft 10d on an outer circumferential surface of which a first externally toothed gear 23 is formed and an outer circumferential surface of the input shaft 20d provided in such a manner as to pass through the interior of the drive shaft 10d so as to rotatably support the outer circumferential surface of the input shaft 20d on the inner circumferential surface of the right end of the drive shaft 10d. Similarly, a second externally toothed gear 24 providing a slightly different gear ratio is rotatably supported on the outer circumferential surface of the input shaft 20d by a bearing 22b at a position close to the first externally toothed gear 23. A pinion shaft 40 is fixed in parallel with the drive shaft 10d in a shoulder portion 5 of the case 7 which is diametrically expanded, and an end of the pinion shaft 40 is supported by a support 7c. A pinion rotatably supported on bearings 41a, 41b has two pinion gears, that is, a first pinion gear 43 and a second pinion gear 44, which are integrally formed while having the numbers of teeth which are slightly different, whereby a torque is multiplied by a differential motion produced by a slight difference in gear ratio between a gearset of the first externally gear 23 and the first pinion gear 43 and a gearset of the second externally toothed gear 24 and the second pinion gear 44.

Since descriptions of the motion direction changing mechanism and the friction engagement mechanism overlap those made in the third embodiment, descriptions thereof will be omitted here.

Next, the operation of the transmission actuator 4 will be described.

As shown in FIG. 4, once an activating signal enters the motor M which is built in the torque generating mechanism, the motor M rotates the rotor 8a fixedly fitted on the hollow drive shaft 10d, as well as the drive shaft 10d which is made integral with the rotor 8a. Then, the first externally toothed gear 23 formed on the outer circumferential surface of the flange-like formed right end of the drive shaft 10d is rotated concentrically relative to the input shaft 20d. Since the first pinion gear 43 and the second pinion gear 44 are formed integrally on the pinion 42, the second pinion gear 44 transmits torque (rotational force) to the second externally toothed gear 24. As a result, since the numbers of teeth of the first externally toothed gear 23 and the second externally toothed gear 24 are different, the numbers of teeth of the first pinion gear 43 and the second pinion gear 44 are also different, and hence, the gear ratios of a gearset of the first externally toothed gear 23 and the first pinion gear 43 and a gearset of the second externally toothed gear 24 and the second pinion gear 44 are different, a differential motion is generated and a speed reduction is implemented to thereby multiply the torque. On the other hand, when the differential motion is so generated, as shown in FIGS. 1B, 1C, the ball 27 rides on the inclined surfaces 25a, 26a formed on the cam grooves 25, 26 of the cam mechanism which are formed in the confronting surfaces of the first externally toothed gear 23 and the second externally toothed gear 24 so that the ball 27 can roll therein, and a gap between the first externally toothed gear 23 and the second externally toothed gear 24 is press expanded, whereby the piston 31 overcomes the biasing force of the spring 32 and pushes against the friction multi-plate clutch 33 to bring it into engagement, the torque being thereby transmitted to the output shaft 30d.

The third and fourth embodiments will be summarized as below. In FIGS. 3, 4, the transmission actuator 3, 4 comprises the torque generating mechanism having, in turn, the rotor 8a provided at the one end of the outer circumferential surface of the drive shaft 10c, 10d and the stator 8b provided on the inner circumferential surface of the transmission case 7, the speed reduction mechanism for multiplying a torque generated by the torque generating mechanism in which the first externally toothed gear 23 formed on the outer circumferential surface of the drive shaft 10c, 10d and the second externally toothed gear 24 which is disposed closely to the first externally toothed gear 23 are provided, the first externally toothed gear 23 and the second externally toothed gear 24 are rotatably supported on the outer circumferential surface of the input shaft 20c, 20d which is provided in such a manner as to pass through the interior of the drive shaft 10c, 10d, and the externally toothed gear 42 on which the first pinion gear 43 and the second pinion gear 44 which are rotatably supported on the pinion shaft 40 is provided for the first externally toothed gear 23 and the second externally toothed gear 24, whereby a torque is multiplied by a differential motion produced by a difference in gear ratio between a gearset of the first externally toothed gear 23 and the first pinion gear 43 and a gearset of the second externally toothed gear 24 and the second pinion gear 44, or, the speed reduction mechanism in which the internally toothed gears are provided for the first internally toothed gear 13 and the second internally toothed gear 14 which are rotatably supported on the inner circumferential surface of the case 7 and which are formed integrally, whereby a torque is multiplied by a differential motion produced by a difference in gear ratio between a gearset of the first externally toothed gear 23 and the first internally toothed gear 13 and a gearset of the second externally toothed gear 24 and the second internally toothed gear 14, the motion direction changing mechanism in which the cam grooves 25, 26 of the cam mechanism are formed in the confronting surface of the first externally toothed gear 23 and the second externally toothed gear 24 so that the ball 27 can roll therein, and the plurality of balls 27, 27 . . . are disposed in the cam grooves 25, 26, whereby the torque multiplied when the ball 27 rides on the inclined surfaces 25a, 26a formed on the cam grooves 25, 26 is converted into the thrust, and the friction engagement mechanism held to the clutch hub 21 integrally formed at the one end of the input shaft 20c, 20d and adapted to be pushed via the piston 31 by the thrust generated by the motion direction changing mechanism for transmitting the torque from the input shaft 20c, 20d to the output shaft 30c, 30d, wherein the drive shaft 10c, 10d is made hollow so that the input shaft 20c, 20d and the output shaft 30c, 30d are disposed in the through hole in the hollow portion of the drive shaft 10c, 10d.

<Fifth Embodiment>

What is different from the first to fourth embodiments is that planet gearsets (planet gear assemblies) are provided in a speed gear reduction mechanism.

Figure 5:
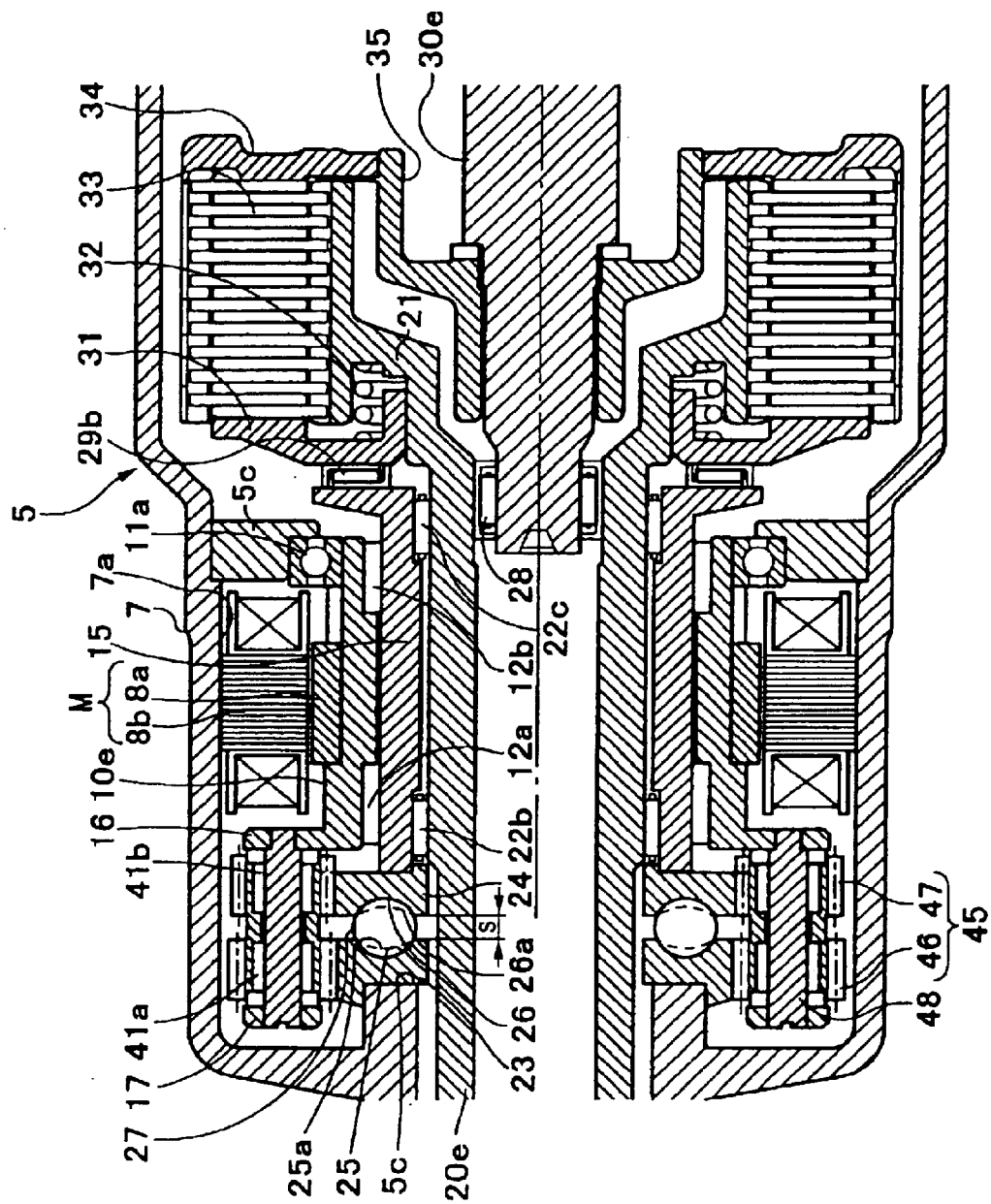
FIG. 5 is a sectional view of a transmission actuator according to a fifth embodiment of the invention.

FIG. 5 is a sectional view showing a transmission actuator according to a fifth embodiment.

Note that since a transmission actuator 5 shown in FIG. 5 is like to the arrangement shown in FIG. 1A, like reference numerals are imparted to like components to those illustrated in FIG. 1A, and a detailed description thereof will be omitted.

As shown in FIG. 5, a transmission actuator 5 includes a torque generating mechanism, a speed reduction gear, a motion direction changing mechanism and a friction engagement mechanism. The torque generating mechanism is a motor M and includes a rotor 8a fixedly fitted on an outer circumferential surface of a hollow drive shaft 10e and a stator 8b fixedly fitted in an inner circumferential surface 7a of a case 7. A bearing 11a is disposed between an outer circumferential surface of the hollow drive shaft 10e and the inner circumferential surface of the case 7 so as to rotatably support the drive shaft 10e on the case 7 via a retainer 5c, and an inner circumferential surface of the drive shaft 10e is rotatably supported by two bushes 12a, 12b. In addition, a carrier 16 for holding a plurality of pinions 42 extends in a flange-like fashion at a left end of the drive shaft 10e, and a carrier 17 for supporting a shaft 48 at both ends thereof is integrally formed. The shaft 48, which is supported at the both ends thereof by holes formed in the carriers 16, 17, rotatably supports a planet gear 45 by bearings 41a, 41b. A first planet gear 46 and a second planet gear 47 are integrally formed on the planet gear 45, the first planet gear 46 and the second planet gear 47 having the numbers of teeth which are slightly different.

The speed reduction mechanism generates a differential motion through a difference in gear ratio between the planet gear assemblies and then implements a speed reduction by the differential motion so generated to thereby multiply a torque generated by the torque generating mechanism through the speed reduction so implemented. In addition, a cylindrical pressure guide 15 is supported on an inner circumference of the drive shaft 10e in such a manner as to move in axial directions, and an input shaft 20e is rotatably supported on an inner circumference of the pressure guide 15 by bearings 22b, 22c. In addition, a first externally toothed gear 23 is fixed to an inner circumferential end face 5c of the case 7 so as to mesh with the first planet gear 46 of the planet gear 45. Additionally, a second externally toothed gear 24 is disposed closely to the first externally toothed gear 23 and is fixed to a left end face of the pressure guide 15. As a result, the first externally toothed gear 23 and the second externally toothed gear 24 mesh with the first planet gear 46 and the second planet gear 47 which are associated therewith, respectively, not only to transmit torque but also to implement a speed reduction through a difference in gear ratio between the two gearsets.

Since the motion direction changing mechanism and the friction engagement mechanism are identical to those described in the second embodiment, descriptions thereof will be omitted here.

Next, the operation of the transmission actuator 5 will be described.

As shown in FIG. 5, when an activating signal enters the motor M of the torque generating mechanism, the motor M rotates the rotor 8a fixedly fitted on the hollow drive shaft 10e, the drive shaft 10e which is made integral with the rotor 8a and the carriers 16, 17 which are provided integrally at the left end of the drive shaft 10e. Then, the first planet gear 46 of the planet gear 45 disposed in the carriers 16, 17 rotates on its axis while walking around the first externally toothed gear 23. As a result, the second planet gear 47 which is formed integrally on the planet gear 45 also rotate on its axis while walking around to rotate the second externally toothed gear 24. That is, the first planet gear 46 and the second planet gear 47 rotate on their axes while walking around, and the second planet gear 47 transmits a rotational force (a torque) to the second externally toothed gear 24. As a result, since the number of teeth of the first externally toothed gear 23 is different from that of the second externally toothed gear 24, the number of teeth of the first planet gear 46 is different from that of the second planet gear 47, and the gear ratios of the gearset of the first externally toothed gear 23 and the first planet gear 46 and the gearset of the second externally toothed gear 24 and the second planet gear 47 are different, a differential motion is generated, whereby a double speed reduction can be implemented to multiply the torque.

On the other hand, when the differential motion is so generated, as shown in FIGS. 1B, 1C, the ball 27 rides on the inclined surfaces 25a, 26a formed on the cam grooves 25, 26 of the cam mechanism which are formed in the confronting surfaces of the first externally toothed gear 23 and the second externally toothed gear 24 so that the ball 27 can roll therein, and a gap between the first externally toothed gear 23 and the second externally toothed gear 24 is press expanded, whereby the piston 31 overcomes the biasing force of the spring 32 and pushes against the friction multi-plate clutch 33 to bring it into engagement, the torque being thereby transmitted to the output shaft 30e.

The fifth embodiment will be summarized as below. In FIG. 5, the transmission actuator 5 comprises the torque generating mechanism having, in turn, the rotor 8a provided at the one end of the outer circumferential surface of the drive shaft 10e and the stator 8b provided on the inner circumferential surface of the transmission case 7, the speed reduction mechanism for multiplying a torque generated by the torque generating mechanism in which the carriers 16, 17 carry the planet gear (planet gear assembly) 45 while holding them thereon are integrally formed on the other end of the drive shaft 10e, a plurality of planet gears 45 each having the first planet gear 46 and the second planet gear 47 are provided for transmitting a torque from the torque generating mechanism, and the first externally toothed gear 23 and the second externally toothed gear 24 which constitute sun gears are provided between the planet gear 46 and the input shaft 20e in such a manner as to be situated close to each other, so that the associated gears mesh with each other to rotate on their axes while walking around, whereby the torque is multiplied by a differential motion produced by a difference in gear ratio between the gearset of the first planet gear 46 and the first externally toothed gear 23 and the gearset of the second planet gear 47 and the second externally toothed gear 24, the motion direction changing mechanism in which the cam grooves 25, 26 of the cam mechanism are formed in the confronting surface of the first externally toothed gear 23 and the second externally toothed gear 24 so that the ball 27 can roll therein, and the plurality of balls 27 . . . 27 are disposed in the cam grooves 25, 26, whereby the torque multiplied when the ball 27 rides on the inclined surfaces 25a, 26a formed on the cam grooves 25, 26 is converted into the thrust, and the friction engagement mechanism held to the clutch hub 21 integrally formed at the one end of the input shaft 20e and adapted to be pushed via the piston 31 by the thrust generated by the motion direction changing mechanism for transmitting the torque from the input shaft 20e to the output shaft 30e, wherein the drive shaft 10e is made hollow so that the input shaft 20e and the output shaft 30e are disposed in the through hole in the hollow portion of the drive shaft 10e.

<Sixth Embodiment>

What is different from the fifth embodiment is that planet gearsets (planet gear assemblies) are provided between a torque generating mechanism and a friction engagement mechanism while a ring gear is additionally provided.

Figure 6:
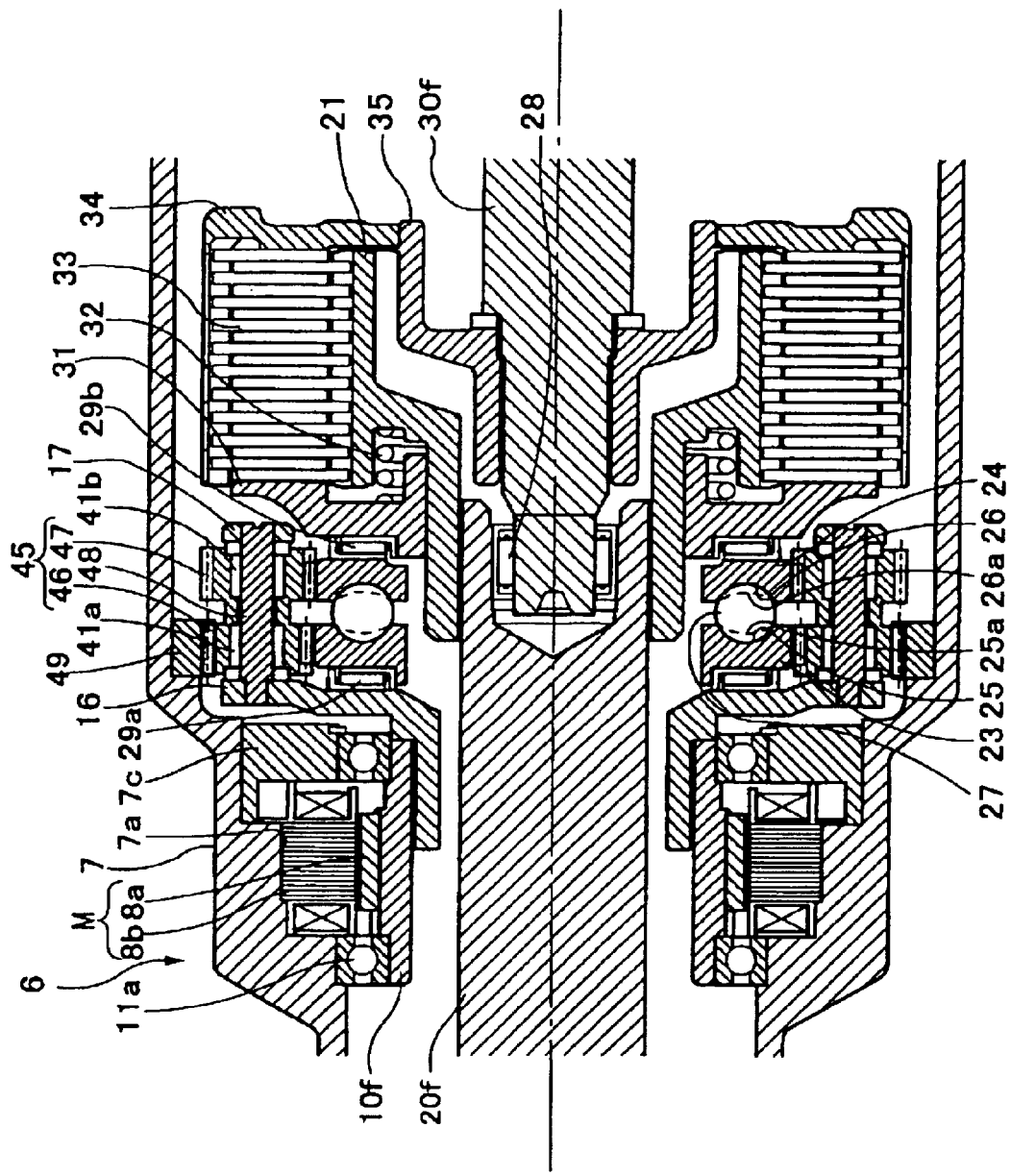
Figure 7A:
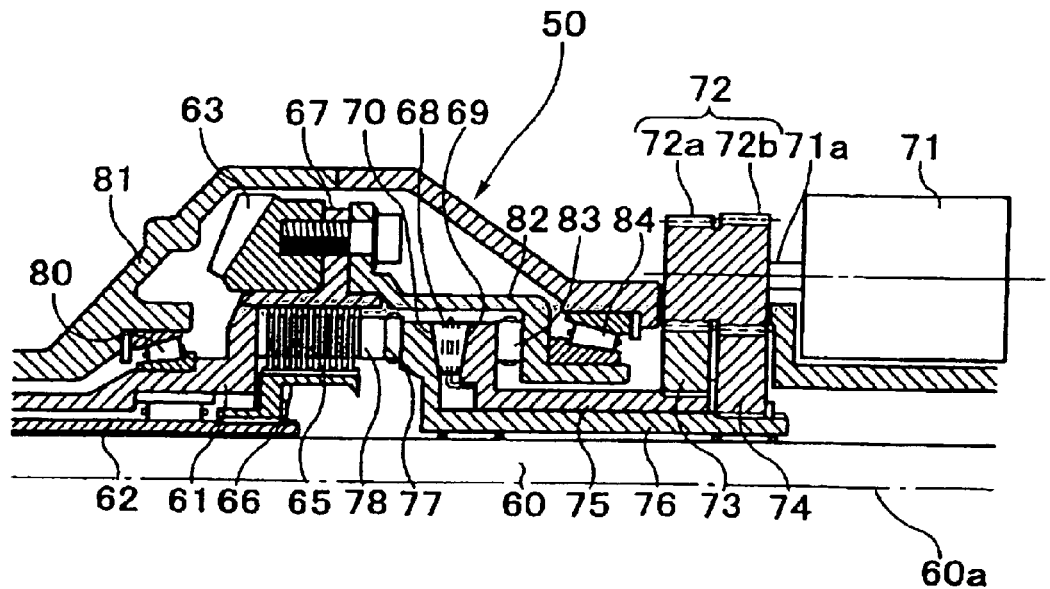
FIG. 7A is a sectional view of an actuator for a friction engagement device.
Figure 7B:
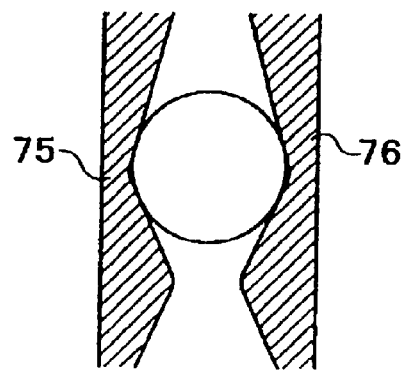
FIG. 7B is a partial sectional view showing the configuration of a cam mechanism.

FIG. 6 is a sectional view showing a transmission actuator according to a sixth embodiment.

Note that since a transmission actuator 6 shown in FIG. 6 is like to the arrangement shown in FIG. 5, like reference numerals are imparted to like components to those illustrated in FIG. 5, and a detailed description thereof will be omitted.

As shown in FIG. 6, a transmission actuator 6 includes, similarly, a torque generating mechanism, a speed reduction gear, a motion direction changing mechanism and a friction engagement mechanism. The torque generating mechanism is a motor M and includes a rotor 8a fixedly fitted on an outer circumferential surface of a hollow drive shaft 10f and a stator 8b fixedly fitted in an inner circumferential surface 7a of a case 7. An inner circumferential surface of a right end of the hollow drive shaft 10f and an outer circumferential surface of a hollow axial end of a carrier 16 which carries a plurality of planet gears 45 are fixedly screwed together, and further more, a carrier 17 for supporting a shaft 48 at ends thereof are similarly wrapped together so as to be formed integrally. In addition, the planet gear 45 is rotatably supported by bearings 41a, 41b which fit on the shaft 48 which is supported at its ends by holes formed in the carriers 16, 17. A first planet gear 46 and a second planet gear 47 are integrally formed on the planet gear 45, the first planet gear 46 and the second planet gear 47 having the numbers of teeth which are slightly different.

The speed reduction mechanism generates a differential motion through a difference in gear ratio between the planet gear assemblies and then implements a speed reduction by the differential motion so generated to thereby multiply a torque generated by the torque generating mechanism through the speed reduction so implemented. A ring-like ring gear (an internally toothed gear) 49 is fixed to the inner circumferential surface of the case 7, and the first planet gear 46 of the planet gear 45 carried by the carriers 16, 17 is brought into mesh engagement with this ring gear 49. A first externally toothed gear 23 and a second externally toothed gear 24 which are each formed into a ring-like configuration are disposed closely to each other between the planet gear 45 and an input shaft 20f, and a ball is held between the two gears. Thrust bearings 29a, 29b are disposed on one side of each gear, respectively. As a result, the first externally toothed gear 23 meshes with the first planet gear 46 of the planet gear 45, while the second externally toothed gear 24 meshes with the second planet gear 47, whereby a torque is transmitted, and a speed reduction is implemented due to the gear ratios of the two gearsets being different.

Since the motion direction changing mechanism and the friction engagement mechanism are identical to those described in the second embodiment, descriptions thereof will be omitted here.

Note that the input shaft 20f and the clutch hub 21 are made to be separate pieces, and the input shaft 20f and the clutch hub 21 are screwed together through screw engagement between external threads formed in an outer circumferential surface of an end of the input shaft 20f and internal threads formed in an inner circumferential surface of the clutch hub 21. An output shaft 30f is rotatably supported in a cantilever-like fashion in a hole opened in an end face of the input shaft 20f via a bearing.

Next, the operation of the transmission actuator 6 will be described.

As shown in FIG. 6, when an activating signal enters the motor M of the torque generating mechanism, the motor M rotates the rotor 8a fixedly fitted on the hollow drive shaft 10f and the drive shaft 10f which is made integral with the rotor 8a. Then, the first planet gear 46 of the planet gear 45 carried by the carriers 16, 17 which are fixedly screwed on the right hand side of the drive shaft 10f revolves around the first externally toothed gear 23 and at the same time rotates on its axis while meshing with the internally toothed gear 49 provided on the inner circumference of the case 7. As a result, the second planet gear 47 which is formed integrally on the planet gear 45 also rotate on its axis while walking around to rotate the second externally toothed gear 24. That is, the first planet gear 46 and the second planet gear 47 rotate on their axes while walking around through the rotation of the drive shaft 10f, and the second planet gear 47 transmits a rotational force (a torque) to the second externally toothed gear 24. As a result, since the number of teeth of the first externally toothed gear 23 is different from that of the second externally toothed gear 24, the number of teeth of the first planet gear 46 is different from that of the second planet gear 47, and the gear ratios of the gearset of the first externally toothed gear 23 and the first planet gear 46 and the gearset of the second externally toothed gear 24 and the second planet gear 47 are different, a differential motion is generated, whereby a double speed reduction can be implemented to multiply the torque.

On the other hand, when the differential motion is so generated, as shown in FIGS. 1B, 1C, the ball 27 rides on the inclined surfaces 25a, 26a formed on the cam grooves 25, 26 of the cam mechanism which are formed in the confronting surfaces of the first externally toothed gear 23 and the second externally toothed gear 24 so that the ball 27 can roll therein, and a gap between the first externally toothed gear 23 and the second externally toothed gear 24 is press expanded, whereby the piston 31 overcomes the biasing force of the spring 32 and pushes against the friction multi-plate clutch 33 to bring it into engagement, the torque being thereby transmitted to the output shaft 30f.

The sixth embodiment will be summarized as below. That is, the sixth embodiment is different from the fifth embodiment in the arrangement and configuration of the speed reduction mechanism. In FIG. 6, the speed reduction mechanism of the transmission actuator 6 is characterized in that the carriers 16, 17 carrying the planet gear 45 while holding them thereon are connected to the drive shaft 10f, that the planet gear 45 having the first planet gear 46 and the second planet gear 47 is disposed at a plurality of locations, that a ring gear 49 is formed in an inner circumferential surface of a transmission case 7 so as to mesh with the first planet gear 46, and that the first externally toothed gear 23 and the second externally toothed gear 24 which constitute sun gears are disposed closely to each other between the planet gears 45 and the input shaft 20f, so that the planet gears 45 and the sun gears are brought into mesh engagement with each other, allowing the planet gears 45 not only to revolve on their own axes but also to rotate around the sun gears, whereby a torque is multiplied through a differential motion produced by a difference in gear ratio between the gearset of the first planet gear 46 and the first externally toothed gear 23 and the gearset of the second planet gear 47 and the second externally toothed gear 24.

Note that the invention can be modified and changed variously without departing from the scope of its technical concept, and it goes without saying that the invention encompasses inventions so modified and changed. For example, the motion direction changing mechanism may include ball screws and nuts instead of the balls and cam mechanism. In addition, the clutch hub formed on the end of the input shaft maybe formed on either of the input shaft and output shaft. While FIGS. 1 to 6 illustrate the input shaft as passing through the drive shaft, the output shaft may be caused to pass through the drive shaft.

While one pinion gear 42 is illustrated as being disposed in FIG. 3, the number of pinion gears disposed is not limited to one, and a plurality of, that is, two, three or four pinion gears 42 may be disposed. The number of teeth of the respective gears shown in FIGS. 1 to 6 may be altered so as to provide preferable gear ratios. Furthermore, while there are provided two planet gear assemblies in FIGS. 5, 6, one, three or four planet gear assemblies may be provided, or any other numbers of planet gear assemblies than those numbers may be disposed.

According to the first aspect of the invention, since the built-in motor is used and the input shaft and the output shaft which are adapted for transmitting power are provided on the inner circumference of the hollow drive shaft of the torque generating mechanism, the influence from the size of the outside diameter of the torque generating mechanism and the center distance between the gears of the speed reduction mechanism does not have to be considered, and therefore, there is no need to reproduce gears in association with the enlargement of the motor, thereby making it possible to realize communication and standardization. In addition, since no portion of the outside diameter line of the motor protrudes from the transmission case, space is less required. Moreover, the gears can be used which can provide a good response in transmitting power and a high contact ratio for good efficiency.

According to the second aspect of the invention, since the contact ratios of the gears can be increased and hence the tooth thickness thereof can be reduced through the mesh engagement between the first and second internally toothed gears which constitute internally contacting drive gears and the first and second externally toothed gears which constitute driven gears, the gears can be made shorter in length and lighter in weight. In addition, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency.

According to the third aspect of the invention, by providing the first internally toothed gear and the second internally toothed gear which contact internally and the first externally toothed gear and the second externally toothed gear which are the driven gears, since the contact ratios of the respective sets of meshing gears are increased and the tooth thickness of the gears can be reduced, the gears can be made shorter in length and lighter in weight. In addition, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency. Furthermore, since torque is designed to be transmitted from the outer circumferences of the pair of gears having the cam mechanism to the outer circumferences of the other pair of gears, the center distance of the speed reduction mechanism can be changed freely without considering the positional relationship between the torque generating mechanism and the drive shaft, and therefore, the degree of freedom in design can be increased, thereby making it possible to cover a wide range of reduction gear ratios.

According to the fourth aspect of the invention, by constituting the speed reduction mechanism by the planet gearsets, no eccentric shaft is needed, and moreover, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency.

According to the fifth aspect of the invention, speed reductions through a number of combinations of reduction gear ratios can be made possible by providing the ring gear on the inner circumferential surface of the transmission case. In addition, no eccentric shaft is needed by incorporating the planet gear assemblies in the speed reduction mechanism, and moreover, since no portion of the outside diameter line of the motor protrudes from the transmission case, the motor is allowed to occupy less space. Thus, the small and light transmission actuator can be provided in which no portion of the outside diameter line of the motor protrudes from the transmission case so that less space can be occupied, and which is made up of gears which can provide a good response in transmitting power and a high contact ratio for good efficiency.

What is claimed is:

1. A transmission actuator comprising:
   a torque generating mechanism including, a rotor provided on an outer circumferential surface of a drive shaft and a stator provided on a transmission case;
   a speed reduction mechanism disposed on either an input shaft or an output shaft for multiplying a torque from the torque generating mechanism;
   a motion direction changing mechanism comprising, two rotational elements adapted for converting a torque multiplied by a cam mechanism provided between confronting faces of a pair of externally toothed gears which constitute the speed reduction mechanism into a thrust and having provided on outer circumferential surfaces thereof the externally toothed gears to which the torque from the speed reduction mechanism is transmitted; and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

2. A transmission actuator comprising:

a torque generating mechanism including, a rotor provided on an outer circumferential surface of a drive shaft and a stator provided on an inner circumferential surface of a transmission case;

a speed reduction mechanism formed integrally on the drive shaft and comprising a first internally toothed gear and a second internally toothed gear, and a first externally toothed gear and a second externally toothed gear which are rotatably supported on an outer circumferential surface of an input shaft or an output shaft so as to mesh with the first internally toothed gear and the second internally toothed gear, respectively, for transmission of a torque, whereby a torque from the torque generating mechanism is multiplied through a differential motion produced by a difference in gear ratio between a set of the first internally toothed gear and the first externally toothed gear and a set of the second internally toothed gear and the second externally toothed gear;

a motion direction changing mechanism for converting a torque multiplied by a cam mechanism provided between confronting faces of the first and second externally toothed gears into a thrust; and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

3. A transmission actuator comprising:

a torque generating mechanism including a rotor provided on an outer circumferential surface of a drive shaft and a stator provided on an inner circumferential surface of a transmission case;

a speed reduction mechanism disposed on either an input shaft or an output shaft, the speed reduction mechanism including two gears having an internally toothed gear and an externally toothed gear, both of which are disposed on outer peripheries of a first externally toothed gear disposed on the drive shaft or a second externally toothed gear disposed adjacent to the first gear, wherein the two gears transmit the torque from the first externally toothed gear to the second externally toothed gear, wherein the speed reduction mechanism multiplies a torque from the torque generating mechanism through a differential motion produced by a difference in gear ratio between a set of one of the two gears and the first externally toothed gear and a set of the other gear and the second externally toothed gears, a motion direction changing mechanism for converting a torque multiplied by a cam mechanism provided between confronting faces of the first and second externally toothed gears into a thrust; and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

4. A transmission actuator comprising:

a torque generating mechanism including, a rotor provided on an outer circumferential surface of a drive shaft and a stator provided on an inner circumferential surface of a transmission case;

a speed reduction mechanism disposed on either an input shaft or an output shaft in which a carrier carrying planet gear assemblies while holding them thereon is formed integrally on the drive shaft, two planet gears for transmitting a torque from the torque generating mechanism are disposed at a plurality of locations, and two sun gears are disposed closely to each other between the planet gear assemblies and the input shaft, whereby a torque from the torque generating mechanism is multiplied through a differential motion produced by a difference in gear ratio between a set of one of the two planet gears and one of the two sun gears and a set of the other planet gear and the other sun gear, while the planet gears and the sun gears mesh with each other;

a motion direction changing mechanism for converting a torque multiplied by a cam mechanism provided between confronting faces of the two sun gears into a thrust; and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

5. A transmission actuator comprising:

a torque generating mechanism including a rotor provided on an outer circumferential surface of a drive shaft and a stator provided on an inner circumferential surface of a transmission case;

a speed reduction mechanism disposed on either an input shaft or an output shaft in which a carrier carrying planet gear assemblies while holding them thereon is formed separately from the drive shaft and is connected to the drive shaft, two planet gears for transmitting a torque from the torque generating mechanism are disposed at a plurality of locations, a ring gear is formed in an inner circumferential surface of a transmission case, and two sun gears are disposed closely to each other between the planet gear assemblies and the input shaft, whereby a torque from the torque generating mechanism is multiplied through a differential motion produced by a difference in gear ratio between a set of one of the two planet gears and one of the two sun gears and a set of the other planet gear and the other sun gear, while the planet gears and the sun gears mesh with each other;

a motion direction changing mechanism for converting a torque multiplied by a cam mechanism provided between confronting faces of the two sun gears into a thrust; and a friction engagement mechanism provided on the input shaft and the output shaft so as to be brought into engagement by virtue of a thrust generated by the motion direction changing mechanism to thereby transmit a power from the input shaft to the output shaft, wherein the drive shaft is made hollow so that the input shaft or the output shaft is disposed in a hollow portion of the drive shaft.

* * * * *